United States Patent [19]

McDermott

[11] 4,024,346
[45] May 17, 1977

[54] TELEPHONE LINE AMPLIFIER
[75] Inventor: Noel C. McDermott, Santa Cruz, Calif.
[73] Assignee: Kentrox Industries, Inc., Portland, Oreg.
[22] Filed: Oct. 10, 1975
[21] Appl. No.: 621,422
[52] U.S. Cl. .............................. 179/1 A; 179/1 F; 179/170 R; 330/30 D
[51] Int. Cl.² .......................................... H04B 3/08
[58] Field of Search ............. 330/86, 103, 108, 29, 330/30 D; 179/1 A, 1 PC, 81 B, 170 R, 1 F; 338/76, 221; 339/17 CF

[56]         References Cited
         UNITED STATES PATENTS

| 2,812,388 | 11/1957 | Thomas | 330/29 |
| 3,260,955 | 7/1966 | Offner | 330/30 D |
| 3,458,821 | 7/1969 | Clarridge | 330/86 |
| 3,867,589 | 2/1975 | Junek | 179/170 G |
| 3,872,395 | 3/1975 | Holland | 330/86 |
| 3,908,178 | 9/1975 | Johnson et al. | 338/221 |
| 3,927,280 | 12/1975 | Gupta et al. | 179/170 G |

Primary Examiner—Kathleen H. Claffy
Assistant Examiner—Randall P. Myers
Attorney, Agent, or Firm—Oliver D. Olson

[57]         ABSTRACT

A power amplifier for use in uni-directional telephone line signal amplification requirements on voice and data grade circuits includes a balanced input transformer and associated differential line transient protection circuit and line matching network, a balanced differential voltage feedback amplifier circuit with externally interchangeable, balanced, passive, terminated attenuators in the voltage feedback path for varying the amplification factor of the signal amplifying circuit, a balanced-to-unbalanced common mode rejection circuit, low and high cut frequency filters, and a balanced output transformer with associated output line matching and circuit protection components. The interchangeable attenuators are calibrated and marked in terms of overall power amplification resulting from their individual and specific use in the circuit.

4 Claims, 4 Drawing Figures

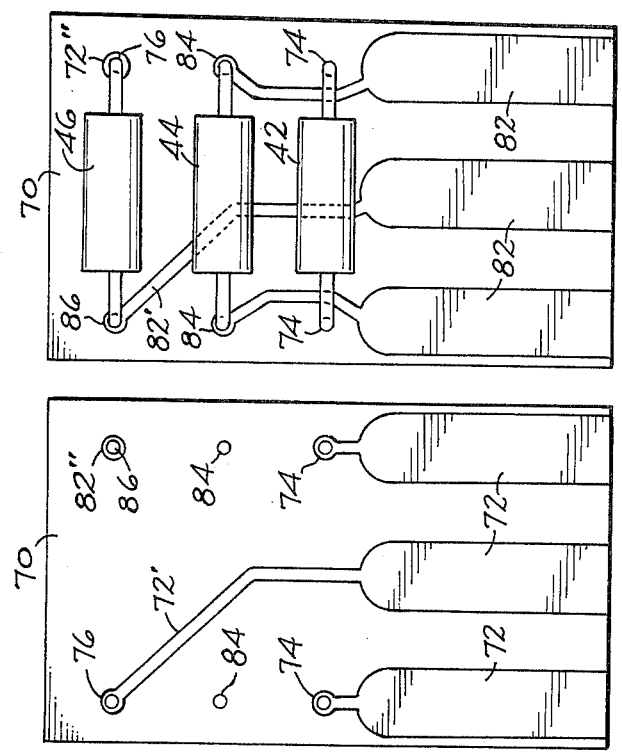
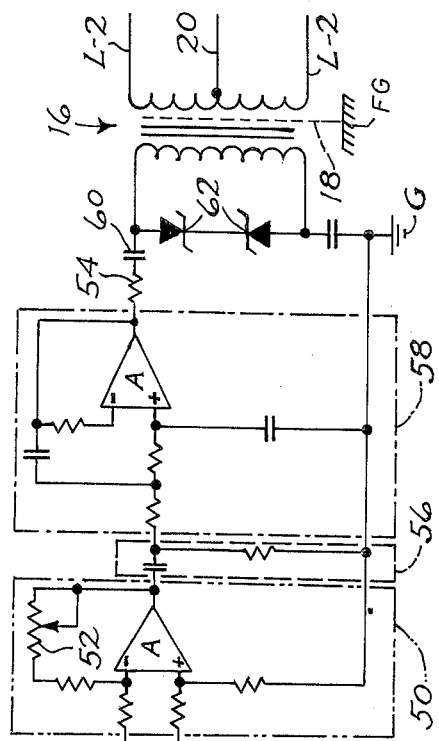
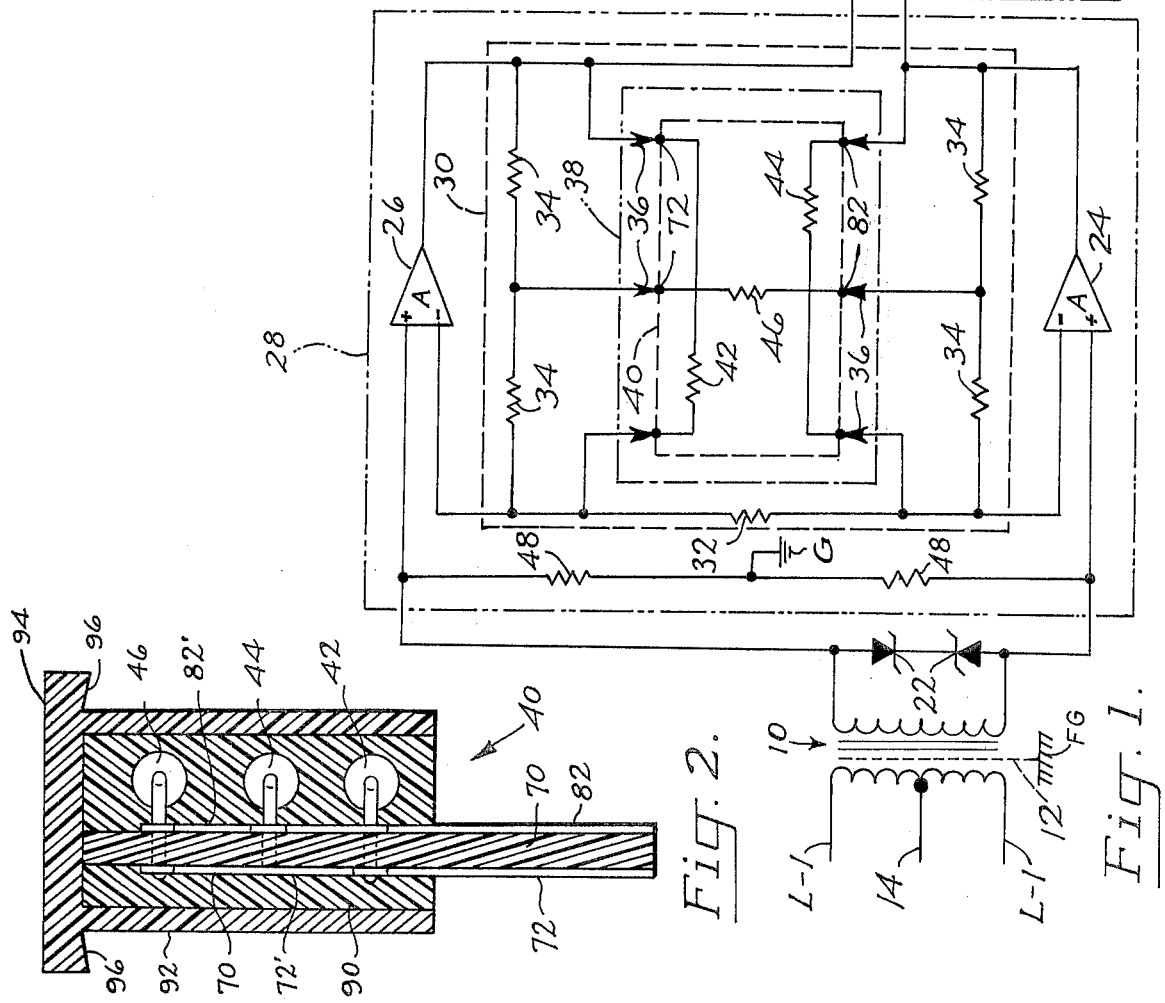

TELEPHONE LINE AMPLIFIER

BACKGROUND OF THE INVENTION

This invention relates to power amplification required on telephone transmission facilities, and more particularly to a novel amplifier by which to vary the power level of telephone line signals quickly and reliably in discrete steps.

Telephone line amplifiers are needed to compensate for signal loss occurring as a function of distance along the transmission facility, often a metallic cable pair. The amplifiers must be spaced closely enough along the facility to prevent the signal from dropping near to the noise level existing on the line, for otherwise the signal cannot be recovered effectively without resorting to sophisticated and costly techniques. For bi-directional two-wire applications, negative impedance or hybrid type repeaters are used. For uni-directional two-wire applications, simpler uni-directional line amplifiers can be used. This type of uni-directional amplifier is referred to hereinafter as "telephone line amplifier."

Telephone line amplifiers provided heretofore incorporate a variety of techniques to control gain or amplification factor, all of which are characterized by presenting some difficulty in determining quickly and accurately the required amplifier gain, whether during installation or during routine testing.

One such prior amplifier utilizes "gain marked" screw-down adjustments. Another utilizes a selection of wire jumpers to select the gain. Still another utilizes a variable potentiometer adjustment, requiring the use of meters to set the desired gain.

The foregoing prior techniques normally require that the amplifier be removed from the normal operational position in the equipment shelf during adjustment. In all cases the adjustment requires considerable time, thereby reflecting adversely on the overall cost of installation and maintenance associated with these prior techniques.

SUMMARY OF THE INVENTION

In its basic concept, the telephone line amplifier of this invention involves the use, as a part of the feedback network of a balanced differential voltage feedback amplifier circuit, of an externally accessible interchangeable component in a balanced, passive, terminated attenuator, for the purpose of varying the power amplification factor of the amplifier and thus the power amplification of telephone line signals applied to the amplifier input.

It is, by virtue of the foregoing basic concept, that the principal objective of this invention is achieved; namely, to overcome the aforementioned disadvantages and limitations of prior telephone line amplifiers.

Another important objective of this invention is the provision of a telephone line amplifier of the class described in which the interchangeable component of the terminated attenuator is of miniature size, whereby to accommodate a high density of amplifiers in a telephone equipment bay and to accommodate a large inventory of diverse power amplification factor setting devices in a minimum of storage space.

A further important objective of this invention is the provision of a telephone line amplifier of the class described in which the power amplification factor or power gain is changed quickly, accurately and reliably by the simple expediency of changing the interchangeable component of the terminated attenuator, accessible on an external face of the amplifier unit, thus not requiring removal of the unit from its normal placement in the equipment location.

Still another important objective of this invention is the provision of a telephone line amplifier of the class described in which the interchangeable components of the terminated attenuator may carry on their exposed face the identification of power amplification factor or power gain, marked in decibel units.

The foregoing and other objects and advantages of this invention will appear from the following detailed description, taken in connection with the accompanying drawing of a preferred embodiment.

BRIEF DESCRIPTION OF THE DRAWING

FIG. 1 is a schematic diagram of the electrical circuit of a telephone line amplifier embodying the features of this invention.

FIG. 2 is a transverse cross section of an interchangeable attenuator component for use with the amplifier of FIG. 1.

FIGS. 3 and 4 are side views of the printed circuit board component of the attenuator component of FIG. 2, as viewed from the left and right, respectively, in FIG. 2.

DESCRIPTION OF THE PREFERRED EMBODIMENT

Referring to FIG. 1, the incoming telephone line L-1 is coupled to the amplifier input circuit by means of a unity ratio input transformer 10. The transformer incorporates a frame grounded (to FG) electrostatic shield 12 between windings to provide high rejection of common mode signals, such as a lightning stroke, or induction from power lines, occurring on the input side transmission facility, whereby to prevent their entry into the amplifier circuit. The shield also provides for a high longitudinal balance presented by the amplifier to the transmission line. A center tap 14 is provided on the line winding of the transformer so that DC simplex signaling may be continuous from the incoming line L-1 to the outgoing line L-2.

The outgoing line L-2 also is coupled to the amplifier circuit through a unity ratio output transformer 16 which also incorporates a frame grounded (to FG) electrostatic shield 18 between windings and a center tap 20 on the line winding, for the same purposes as previously described.

The secondary winding of the input transformer 10 is bridged with a constant line terminating impedance, provided by resistors 48, and two zener diodes 22 arranged in a series back-to-back connection to provide protection against excessive differential voltage levels occurring on the incoming line.

The incoming signal is routed from the secondary of the input transformer 10 to one of the input pairs of a pair of phase-matched operational amplifiers 24 and 26 which form components of a balanced differential voltage feedback amplifier 28. In the embodiment illustrated, these input pairs are chosen to be the non-inverting inputs, i.e., those marked (plus) +.

The amplifier circuit incorporates, as a feedback network, a balanced, passive, resistive attenuator 30 terminated by resistor 32. The attenuator is connected between the other amplifier inputs, for example the inverting in puts, marked (minus) −, of the operational amplifiers 24 and 26.

Conveniently, the pair of operational amplifiers may be provided by integrated circuit RC 4558 manufactured by Raytheon Corporation, or by similar equivalent devices. The attenuator 30 includes the four equal value resistors 34, typically of value 301 ohms each. These, and the terminating resistance 32, as well as the outputs and the inverting inputs of the operational amplifiers, are connected to appropriate contacts 36 of a socket element 38. The socket element serves to removably support and detachably couple to said contacts any one of a plurality of interchangeable attenuator components 40, a preferred structural form of which is described in detail hereinafter. In the embodiment illustrated in FIG. 1, the interchangeable component includes three resistances 42, 44 and 46. Resistance 42 is connected across the upper series pair of resistors 34, and resistance 44 is connected across the lower series pair of resistors 34. Resistance 46 interconnects the common junctions between the upper and lower pairs of resistors 34.

A balanced differential input signal voltage to the amplifier is provided by generating a virtual center tap on the secondary winding of transformer 10 by splitting the line L-1 termination into two equal resistive halves, by means of the equal value resistors 48 and connecting the junction of these two resistors to circuit ground G. This arrangement terminates the transformer in the line L-1 impedance, thus reflecting the proper constant terminating impedance to the transmission line from the amplifier.

An incoming signal, appearing, differentially, between the non-inverting inputs of the dual operational amplifiers 24 and 26, is amplified to a degree determined, essentially, by the feedback network. Thus, the connection of the balanced attenuator 30, complete with its termination 32, into the feedback path between the outputs and the inverting inputs of the dual operational amplifiers is such that a signal appearing at the balanced outputs of the amplifiers also appears as an input to the attenuator. This signal is attenuated in exact accordance with the network loss of the terminated attenuator 30, and the resultant signal, appearing across the terminating resistor 32, is also connected between the inverting inputs of the operational amplifiers. That is, the output signal from the attenuator 30, the input signal to which is the output signal of the operational amplifiers, will be attenuated by the actual decibel loss of the attenuator, which loss is associated with and designated to the interchangeable attenuator component 40, and that particular signal output from the attenuator will be applied to the inverting inputs of the operational amplifiers.

Accordingly, a causal signal appearing between non-inverting inputs of the operational amplifiers results in an output signal which becomes an input signal to the attenuator, properly terminated, the output of which is applied between the inverting inputs of the operational amplifiers, which signal is now an opposing causal force on the output thereof.

The amplification process of the operational amplifiers 24 and 26, in conjunction with the attenuator feedback network 30, is such that the signal will be amplified at the amplifier outputs, which are also the inputs to the attenuator 30, to a level that would be effective in reducing the differential voltage between the inverting and the non-inverting inputs of each operational amplifier toward zero volts. In other words, the amplification process will attempt to drive the voltage between the inverting input and non-inverting input of each operational amplifier toward a null. That condition will be approached when the output of the terminated, balanced feedback network, i.e., the signal appearing between the inverting inputs of the operational amplifiers approaches, in magnitude and phase, the balanced input signal appearing between the non-inverting inputs of the amplifiers.

For example, if the attenuator 30 provides a 10 volt drop and a 1 volt signal is applied to the incoming line L-1, providing a 1 volt input between the amplifier non-inverting in puts, the attainment of a 1 volt inphase signal of the same waveform between the amplifier inverting inputs will cause the null. Thus, when the applied 1 volt input signal is amplified to near 10 volts, the attenuator 30 drops the near 10 volt signal to near 1 volt at the inverting inputs. The null thus approached between the inverting and non-inverting inputs results in the amplifier being stabilized with a 10 volt output. The resulting voltage gain of the amplifier may be expressed as 20db with respect to the input signal level. Since the input impedance of the attenuator 30 is identical in ohmic value with its correct termination impedance 32, and further is identical with the amplifier input impedance at its non-inverting inputs, to which the incoming line signal is applied, the power loss of the attenuator, or conversely, the power gain of the amplifier, is identical with the voltage loss or gain, respectively, in decibel units.

As another example, let it be assumed that it is desired to increase the line signal from 1 milliwatt at the input to 10 milliwatts at the output. This power gain of 10 is achieved by utilizing a symmetrical terminated attenuator 30 providing a 10 db attenuation. Thus, as the resultant voltage of the incoming signal of 1 milliwatt, appearing across resistors 48 and the non-inverting inputs of operational amplifiers 24 and 26, is amplified by the operational amplifiers to the point where the output thereof is 10 milliwatts, that 10 milliwat signal is dissipated and attenuated through the 10 db attenuator network so that 1 milliwatt is applied to the termination 32 of resistance value equal to the summation of resistors 48, and the resultant voltage to the inverting inputs of the operational amplifiers. The voltage null, referred to previously, occurs between the operational amplifiers inverting and non-inverting inputs, and the output of the latter thus is stabilized at 10 milliwatts.

It is to be noted that the total attenuation provided by the terminated attenuator network involves both the fixed resistors 32 and 34 as well as the resistors 42, 44 and 46 associated with the interchangeable component 40. The magnitudes of these latter resistors 42, 44 and 46 are varied to provide the total attenuator network with a desired power loss. In other words, the magnitudes of the resistors in the interchangeable component are of given fixed values to provide the total attenuator network with a particular power loss of, for example, 10 db, and they are of different fixed values to provide the total attenuator network with a different loss value of, for example, 20 db. Thus, each interchangeable component conveniently may be marked on a visible surface with the decibel loss it provides at the output of the terminated attenuator 30. In the previous illustrations, these markings would be 10 db and 20 db, respectively.

Although the attenuator network in the feedback path of the operational amplifiers functions to attenuate the negative feedback signal, it effectively establishes the stabilized gain of the differential amplifier, as will be apparent from the foregoing illustrations. In this respect, the amplifier power gain is directly related to the power loss, in decibels, of the balanced, symmetrical, terminated attenuator network in the feedback path, and the attenuator network functions specifically as a power divider.

Since the amplifier power gain is identical to the terminated attenuator loss, the markings on the interchangeable component of the attenuator serve, effectively, to identify the amplifier power gain resulting from their use. Accordingly, any desired gain factor may be selected with maximum speed and facility simply by appropriate selection and insertion of the correct interchangeable component in the socket 38, accessible on an external face of the normally positioned amplifier package.

The balanced output from the dual operational amplifiers 24 and 26 is connected to a balanced-to-unbalanced amplifier 50 the gain and common mode balance of which may be adjusted by the potentiometer 52. The gain of the amplifier 50 is chosen to overcome the matching loss of line L-2 matching impedance 54 and the insertion losses of line coupling transformers 10 and 16, thus resulting in an overall line-to-line power gain determined only by the balanced, gain-changeable amplifier 28.

The output of amplifier 50 is connected to a single pole low cut frequency filter 56 for attenuating undesirably low frequencies, for example below 200 Hertz. The signal then passes through a two pole high cut active frequency filter 58 for attenuating undesirably high frequencies, for example above 3400 Hertz, and thence through the passive resistive device 54, which provides a constant inpedance termination to the output transmission line L-2. The signal then is coupled through a DC blocking capacitor 60 to the primary winding of the output transformer 16. This primary winding also is bridged by the pair of back-to-back series connected zener diodes 62, to provide protection from excessive differential signal levels appearing on the output transmission line L-2, as described previously. The electrostatic shield 18, adjacent to the line winding of transformer 16, provides rejection, from the amplifiers, of common mode signals appearing on the transmission line L-2, and presents high longitudinal balance to the transmission line L-2 from the amplifier, also as described previously.

The resistance values of the various resistors forming the attenuator, may be varied as desired. As a typical example, the integrated resistors 34 may be 301 ohms each and the terminating resistor 32 may be 604 ohms. If it is desired that the attenuator network provide a power attenuation of 3.0 decibels, the series resistors 42 and 44 of the interchangeable component 40 are chosen to have a resistance of 123.8 ohms each and the shunt resistor 46 is chosen to have a resistance value of 1,454 ohms. Various other values for the series and shunt resistors are selected to provide an attenuation range of, for example, from 0 decibels to 30 decibels in 0.2 decibel increments.

As mentioned previously, the interchangeable component 40 is provided, preferably, in miniature form and is constructed preferably in the manner illustrated in the FIGS. 2, 3 and 4. The component illustrated therein includes a printed circuit board 70 or other form of substrate of electrically non-conductive material. Typically, the substrate is ⅜ inch wide, 1/16 inch thick and ¾ inch long.

The substrate is provided with a plurality of pairs of spaced electrical conductors deposited on at least one of its sides. In the preferred embodiment illustrated, and best shown in FIGS. 3 and 4, the conductors are aligned in pairs on opposite sides of the substrate. Thus, on the side illustrated in FIG. 3 there are three spaced conductors 72. Each extends inwardly from the bottom end of the substrate and the inner ends of the two outer conductors communicate with spaced openings 74 formed through the substrate. The center conductor is connected to an extension 72' which communicates through an opening 76 in the substrate with a circular conductor portion 72" surrounding the opening on the opposite side of the substrate (FIG. 4).

On the side of the substrate illustrated in FIG. 4, there is also deposited a plurality of spaced electrical conductors 82. Each conductor is aligned with one of the conductors 72 on the opposite side of the substrate (FIG. 3) and extends inwardly from the bottom end thereof. The inner ends of the two outer conductors are extended to spaced openings 84 formed through the substrate. The center conductor is connected to an extension 82' which communicates through an opening 86 in the substrate with a circular conductor portion 82" surrounding the opening on the opposite side of the substrate (FIG. 3).

Electrical resistance means interconnects the inner ends of the deposited electrical conductors of each pair. Although the resistant means may be provided by the well known deposition techniques of applying suitably resistive material directly on a substrate, the preferred arrangement illustrated utilizes a conventional resistor element having electric leads projecting from its opposite ends for insertion in the pairs of spaced openings in the substrate. These leads are soldered or otherwise secured to the corresponding deposited electrical conductors on the substrate.

As illustrated, there are three pairs of deposited electrical conductors on the substrate and three associated resistors. Two of the resistors are the series resistors 42 and 44 illustrated in FIG. 1, and these are connected in series with the two outer pairs of conductors on opposite faces of the substrate. The third resistor 46 is the shunt resistor illustrated in FIG. 1, and it is connected in series with the center pair of conductors on opposite sides of the substrate at the spaced openings.

In the preferred embodiment illustrated, the resistors and inner supporting portion of the substrate are encased in epoxy resin 90 (FIG. 2) or other suitable electrical non-conductive potting material. For this purpose, it is also preferred that an electrically non-conductive hollow case 92 be provided to contain the potting material (FIG. 2). The case is closed at one end by a wall 94, while the opposite end is open to receive the resistor mounting portion of the printed circuit board and the potting material. The lateral sides of the closure wall 94 preferably project from the corresponding side walls of the case to provide finger-gripping shoulders 96 by which to facilitate removal of the unit from a mounting socket connector 38.

Typically, the miniaturized casing 92 of the component is ½ inch wide, ¼ inch thick and ½ inch long, the side wall being 1/16 inch thick and the end wall 94 being 1/16 inch thick. The cooperating substrate 70 is ⅜ inch wide, 1/16 inch thick and ¾ inch long. Thus, when the substrate is inserted into the casing, about ¼ inch of the substrate projects from the casing. It is this projecting portion of the substrate that provides removable, resilient engagement of the conductors 72 and 82 with the corresponding resilient contacts 36 provided in the socket connector 38.

It is to be noted that the portion of the substrate 70 projecting from the case 92 is in the form of a flat blade. Thus, by arranging the resistors 42, 44 and 46 in the symmetrical pattern illustrated in FIG. 4, the component 40 (FIG. 2) may be installed in a socket connector 38 (FIG. 1) in either of its 180° positions of rotation without affecting the intended operation of the circuit. This reduces, materially, the time factor involved in installation and replacement of the interchangeable attenuator components.

In the use of the telephone line amplifier described hereinbefore, it is to be understood that the unit illustrated in FIG. 1 is connected into the telephone line, by means of the input and output transformers. Then, if it is desired that the incoming signal be amplified by a factor of, for example 4.2 db, a miniaturized, interchangeable component 40 having 4.2 db inscribed on the exposed outer face 94 of the casing is selected from inventory, and inserted into the socket 38. The resistor incorporated in the interchangeable component 40, in conjunction with the fixed resistors 34 and terminating resistor 32 of the attenuator 30, in conjunction with the operational amplifiers 24 and 26, and in conjunction with the remaining elements of the circuit of FIG. 1, results in a stabilized output signal from the amplifier having a gain of 4.2 db, with reference to the input, as explained previously.

In the event it is determined later that the incoming signal should be amplified, for example, to a gain of 6.8 db, the change may be accomplished with speed and facility simply by replacing the 4.2 db interchangeable component 40 with a similar component marked 6.8 db on its exposed face 94.

From the foregoing it will be appreciated that the present invention provides a telephone line amplifier of economical construction and of such miniaturized size as to reduce, significantly, the space requirement, maintenance and other substantial cost factors associated with telephone Central Office plant or private business location operations. The amplifier includes a miniaturized interchangeable attenuator component of economical construction which may be provided in a wide range of incrementally varying attenuations and correspondingly marked in terms of overall amplifier gain, the interchangeable components being of such small size as to minimize the inventory storage space.

It will be apparent, to those skilled in the art, that various changes may be made in the size, shape, type, number and arrangement of parts described hereinbefore without departing from the spirit of this invention.

Having now described my invention and the manner in which it may be used, I claim:

1. A telephone line amplifier having constant input and output impedance, comprising a differential voltage feedback amplifier arranged for interposition between an incoming telephone line and an outgoing telephone line and for connection of its input to the incoming telephone line and its output to the outgoing telephone line, the amplifier including a symmetrical, terminated attenuator network in the amplifier negative feedback path, having substantially identical input and output impedances, the attenuator network including an interchangeable attenuator component arranged to provide the attenuator network with a predetermined power loss which is identical in magnitude to a desired predetermined power gain for the amplifier.

2. The telephone line amplifier of claim 1 wherein the attenuator component is externally accessible relative to the telephone line amplifier and has a visible surface marked, in decibel units, with the amplifier power gain resultant from its use.

3. A telephone line amplifier, comprising a differential voltage feedback amplifier arranged for connection of its input to an incoming telephone line and its output to an outgoing telephone line, the amplifier including a symmetrical, terminated attenuator network in the amplifier negative feedback path, having substantially identical input and output impedances, the attenuator network including an interchangeable attenuator component arranged to provide the attenuator network with a predetermined power loss which is identical in magnitude to a desired predetermined power gain for the amplifier, the differential voltage feedback amplifier including a pair of phase matched operational amplifiers each having an output, a noninverting input and an inverting input, the attenuator network having a two terminal input connected between the outputs of the operational amplifiers and a two terminal terminated output connected between the inverting inputs of the operational amplifiers, the non-inverting inputs of said amplifiers being arranged for connection to a terminated incoming telephone line and the outputs of said amplifiers being arranged for connection to an impedance matched outgoing telephone line.

4. The telephone line amplifier of claim 3 wherein:
 a. the terminated attenuator network includes a fixed attenuator section associated with the interchangeable attenuator component, the fixed attenuator section having a plurality of electrical resistance elements, and the interchangeable attenuator component having a plurality of electrical resistance elements the resistance values of which are chosen to cooperate with the resistance elements of the fixed attenuator section to provide the said terminated attenuator network with said predetermined power loss and the said amplifier with said predetermined power gain,
 b. the fixed attenuator section and the interchangeable attenuator component include symmetrically arranged, interengageable electrical contacts, whereby the attenuator component is capable of removable connection to the fixed attenuator section in either of two 180° positions of rotation relative to the fixed attenuator section, and
 c. the attenuator component is externally accessible relative to the telephone line amplifier and has a visible surface marked, in decibel units, with the amplifier power gain resultant from its use.

* * * * *